(12) United States Patent
Franke et al.

(10) Patent No.: US 7,434,116 B2
(45) Date of Patent: Oct. 7, 2008

(54) UNITARY TESTING APPARATUS FOR PERFORMING BIT ERROR RATE MEASUREMENTS ON OPTICAL COMPONENTS

(75) Inventors: Jorge Eduardo Franke, Orefield, PA (US); John Sargent French, Palm, PA (US); Sheldon Louis Sun, Breinigsville, PA (US); William Joseph Thompson, Kempton, PA (US)

(73) Assignee: Circadiant Systems, Inc., Allentown, PA (US)

( * ) Notice: Subject to any disclaimer, the term of this patent is extended or adjusted under 35 U.S.C. 154(b) by 769 days.

(21) Appl. No.: 10/265,703

(22) Filed: Oct. 8, 2002

(65) Prior Publication Data

US 2003/0031398 A1 Feb. 13, 2003

(51) Int. Cl.
*G06F 11/00* (2006.01)
*G01N 21/00* (2006.01)
(52) U.S. Cl. .................................. 714/704; 356/73.1
(58) Field of Classification Search ................ 714/704, 714/724, 799, 738, 732; 356/73.1, 110, 189
See application file for complete search history.

(56) References Cited

U.S. PATENT DOCUMENTS

| | | | |
|---|---|---|---|
| 3,892,494 A | 7/1975 | Baker et al. | |
| 5,548,399 A | 8/1996 | Takai et al. | |
| 5,566,088 A | 10/1996 | Herscher et al. | |
| 5,579,145 A * | 11/1996 | Bogdan et al. | 398/9 |
| 5,652,668 A | 7/1997 | Aulet et al. | |
| 5,808,760 A | 9/1998 | Gfeller | |
| 5,841,667 A | 11/1998 | Martin | |
| 5,870,211 A | 2/1999 | Yoshida | |
| 6,201,600 B1 | 3/2001 | Sites et al. | |
| 6,259,543 B1 | 7/2001 | Golovchenko et al. | |
| 6,304,350 B1 * | 10/2001 | Doerr et al. | 398/9 |
| 6,373,563 B1 | 4/2002 | Stimple et al. | |
| 6,590,644 B1 * | 7/2003 | Coin et al. | 356/218 |
| 6,676,304 B1 * | 1/2004 | Coin et al. | 385/89 |
| 6,851,086 B2 * | 2/2005 | Szymanski | 714/781 |

* cited by examiner

*Primary Examiner*—Phung M. Chung
(74) *Attorney, Agent, or Firm*—Volentine & Whitt, PLLC

(57) ABSTRACT

A testing apparatus for testing optical components includes an optical transmitter, an optical attenuator, an optical power meter and an optical receiver which are substantially rigidly coupled in a fixed relation to each other within a single housing. The system permits the common control of all the optical components such that calibration, testing and troubleshooting may be performed using a common user interface. The testing apparatus is unitary, compact and portable, and is a much more robust testing apparatus than conventional schemes.

20 Claims, 4 Drawing Sheets

UNITARY TESTING APPARATUS FOR PERFORMING BIT ERROR RATE MEASUREMENTS ON OPTICAL COMPONENTS

CROSS-REFERENCE TO RELATED APPLICATIONS

The present application claims priority under 35 U.S.C. 120 to PCT/US02/06365 filed on Mar. 5, 2002, which is hereby incorporated by reference in its entirety for all purposes.

BACKGROUND OF THE INVENTION

1. Field of the Invention

This invention relates generally to optical communication systems. More particularly, the invention pertains to a system for testing optical communication systems, subsystems and components.

2. Description of the Background Art

Opto-electronic components, including fiber optic cables, connectors, transmitters, receivers, switches, routers and all other types of optical components have become the backbone of the modern telecommunication infrastructure. Due to their relatively low error rate and wide bandwidth, optical communication systems have supported an explosion in the growth of data communication systems, such as the Internet. With the Internet in its infancy, it is expected that the reliance on optical components and systems will only increase as the Internet becomes more closely intertwined with mainstream business and consumer applications.

Although the technology associated with optical communication systems and components has greatly advanced over the last decade and the use of such technology has accelerated, the technology associated with testing optical communication systems and components has greatly lagged.

An optical communication system is only as fast and reliable as the worst component within the system. Each component and/or subsystem within the system must be tested to ensure that it meets minimum technical standards that have been set in the industry. In order to ensure that a particular component, subsystem or system meets or exceeds technical standards, that component, subsystem or system must be tested. This involves a tedious and time-consuming process that leads to human error.

A known testing scheme 10 is shown in FIG. 1. The scheme 10 typically includes an optical transmitter 12, an optical attenuator 14, an (optional) optical monitor 16 and a optical receiver 18. A device under test 25 (DUT) is placed between the transmitting side 20, (which comprises the transmitter 12, the attenuator 14 and the optical monitor 16), and the receiving side 22, (which comprises the receiver 18). These components 12, 14, 16, 18 are separately specified, purchased and calibrated. These components are then interconnected with fiber optic cables 24, connectors 26 and splitter 28.

In order to test the bit error rate (BER), or sensitivity, of the DUT 25, a technician energizes the optical transmitter 12 and starts transmitting at a level of optical power which is sufficient for the DUT 25 to process without errors. The optical signal is transmitted from the optical transmitter 12, through the optical attenuator 14, through the DUT 25 and is received by the optical receiver 18. The technician measures at the optical receiver 18 the number of errors received during the transmission between the optical transmitter 12 and the optical receiver 18. During a typical testing regimen, the technician sends the test signal at a certain optical power, measures the number of errors and, using the attenuator 14, subsequently attenuates the test signal to a lower optical power as seen by the DUT 25. The technician then measures the number of errors at this lower optical power. This process is repeated over a range of optical powers that is suitable for the DUT 25.

This testing scheme, which has not fundamentally changed since the origins of the fiber optic communication industry, has disadvantages. First, each of the components must be separately specified and purchased. Each of these components must then be separately tested and calibrated, and then all the components must be assembled and then tested.

The assemblage of multiple optical components also poses a problem due to the number of optical interfaces. Optical interfaces, which are the interfaces between one optical component and another, typically include a piece of optical equipment and a fiber optic cable or connector. It is often tedious to recalibrate the entire optical system in order to account for the losses introduced because of these optical interfaces.

Given such an arrangement of equipment, due to the number of individual pieces of testing equipment, the size of each piece of testing equipment and the delicacy of the entire testing arrangement, this testing scheme is generally used in an optical laboratory environment. As a practical matter, it is almost impossible to test a piece of operating equipment installed in the field with this scheme. If a piece of optical equipment must be tested, the equipment must be physically removed from the field and brought to the laboratory for testing.

An additional drawback with such an arrangement is cost. Each piece of equipment is expensive. What drives this expense is the redundancy in the number of components, i.e., power supplies, display screens, controlling microprocessors and the housing for all of these separate optical components.

Accordingly, typical testing schemes in the optical industry are time consuming, expensive and cumbersome. An inexpensive testing unit which greatly simplifies the testing of optical components is thus needed.

SUMMARY OF THE INVENTION

The present invention is therefore directed to a system for testing the sensitivity of optical components, which substantially overcomes one or more of the problems due to the limitations and disadvantages of the prior art.

In accordance with an exemplary embodiment, an optical testing apparatus for measuring sensitivity of an optical component, the optical component having an input port and an output port, the optical testing apparatus includes: an optical signal generator that generates an optical signal at a selectable power level; a first port that provides the optical signal as an output of the optical testing apparatus for coupling to the input port of the optical component; a second port for coupling the optical testing apparatus to the output port of the optical component; an optical receiver that receives the optical signal from the optical component via the second port and analyzes the received optical signal for errors; and a platform upon which the optical signal generator and the optical receiver are secured, the optical signal generator and the optical receiver being rigidly fixed in relation to each other.

In accordance with another exemplary embodiment of the present invention, a testing apparatus includes an optical signal generator that generates and outputs an optical signal at a selectable power level as an output of the testing apparatus to the optical component; an optical receiver that receives the optical signal from the optical component as an input of the testing apparatus and that analyzes the received optical signal for errors; a controller that controls the optical signal generator and the optical receiver; and a housing that encloses the optical signal generator, the optical receiver and the controller, the optical signal generator and the optical receiver being mounted in a fixed relationship to each other within the housing.

In accordance with another exemplary embodiment of the present invention, a testing apparatus for measuring sensitivity of an optical component having an input port and an output port includes: an optical signal generator that generates an optical signal at a selectable power level for application to the input port of the optical component; an optical receiver that receives the optical signal from the output port of the optical component and analyzes the received optical signal for errors; and a generally rigid platform for retaining the optical signal generator and the optical receiver, the optical signal generator and the optical receiver being in a fixed relationship to each other.

In accordance with another exemplary embodiment of the present invention, a testing apparatus for measuring sensitivity of an optical component having an input port and an output port, the testing apparatus including an optical signal generator that generates and outputs an optical signal at a selectable power level for application to the input port of the optical component; an optical receiver that receives the optical signal from the output port of the optical component and that analyzes the received optical signal for errors; and a controller that controls the optical signal generator and the optical receiver, the optical signal generator and the optical receiver being mounted in a fixed relationship to each other.

BRIEF DESCRIPTION OF THE DRAWINGS

The invention is best understood from the following detailed description when read with the accompanying drawing figures. It is emphasized that the various features are not necessarily drawn to scale. In fact, the dimensions may be arbitrarily increased or decreased for clarity of discussion.

DETAILED DESCRIPTION

In the following detailed description, for purposes of explanation and not limitation, exemplary embodiments disclosing specific details are set forth in order to provide a thorough understanding of the present invention. However, it will be apparent to one having ordinary skill in the art having had the benefit of the present disclosure, that the present invention may be practiced in other embodiments that depart from the specific details disclosed herein. Moreover, descriptions of well-known devices, methods and materials.

Figure 1:
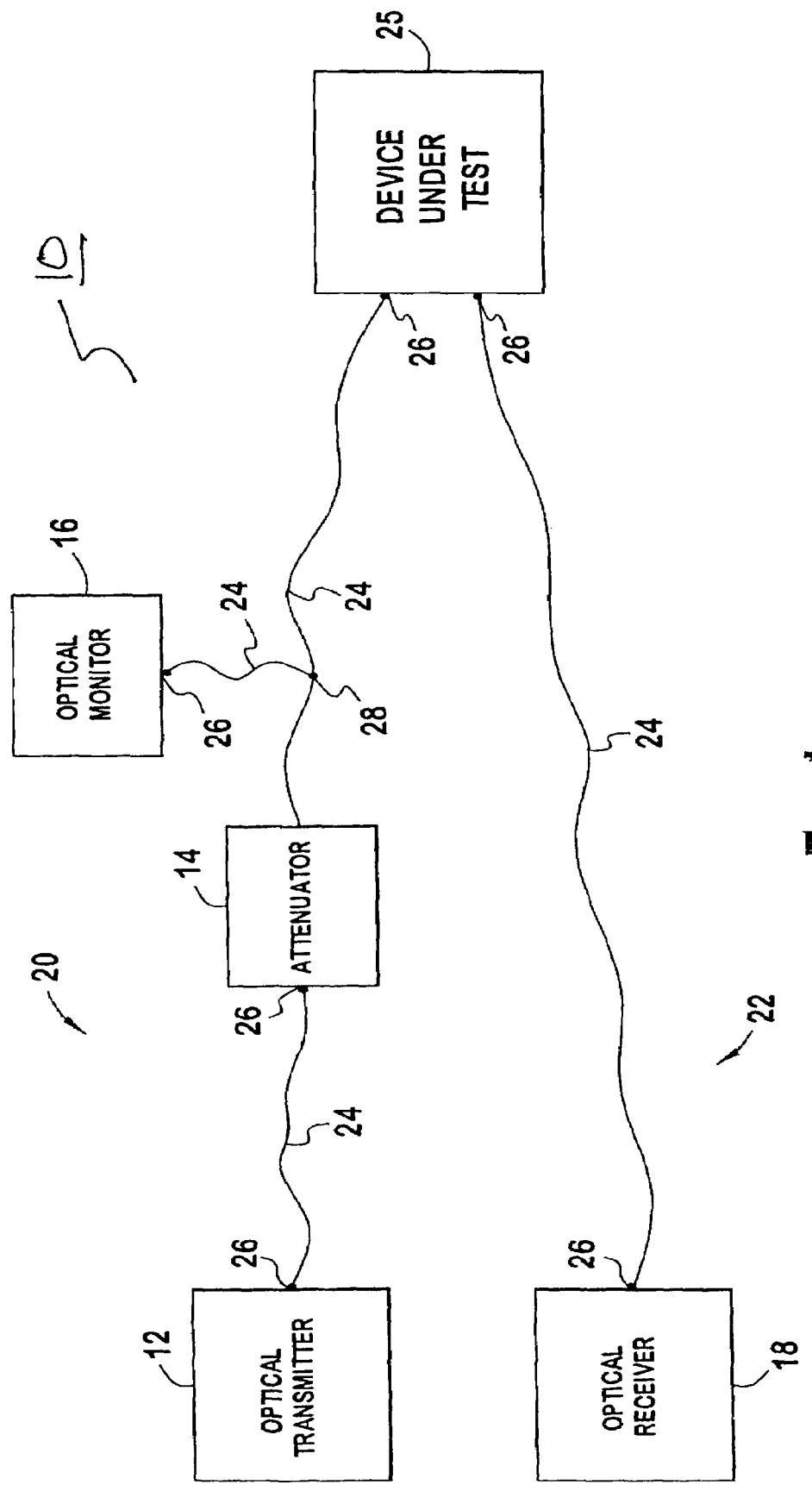
FIG. 1 illustrates a conventional testing scheme.
Figure 2:
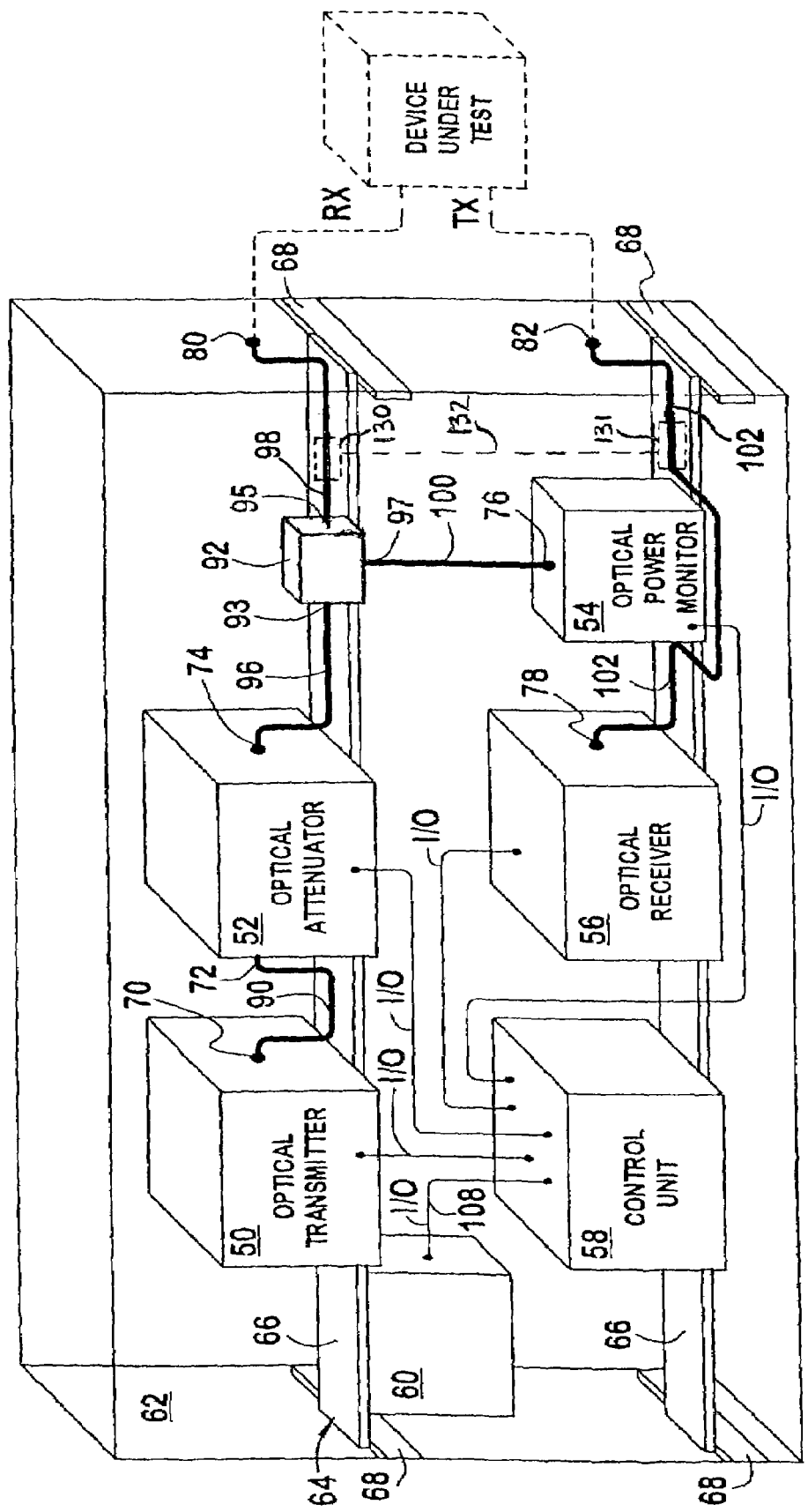
FIG. 2 is a perspective view of a testing apparatus of the present invention.

Referring to FIG. 2, an illustrative embodiment of the testing apparatus of present invention includes an optical transmitter 50, an optical attenuator 52, an optical power monitor 54, an optical receiver 56, a microprocessor (control unit) 58, and an optical splitter 92. A graphical user interface 60 is also illustrated, and may be optionally included in the testing apparatus. Of course, it should be recognized that the optical components are not drawn to scale. All of the optical components are protected by a unitary housing 62. The housing 62 includes a substantially rigid chassis 64 comprising a plurality of cross-pieces 66 and headers 68. Although chassis 64 is described as including a number of cross-pieces 66 and headers 68, it should be understood that a purpose of chassis 64 is to fix all of the optical components 50-56 in a rigid spatial relationship to one another. Accordingly, the chassis 64 may in the alternative include a single unitary rigid platform. As a further alternative, the chassis may be eliminated entirely and all of the optical components 50-56 and the non-optical components 58-60 may be attached directly to the housing 62, if the housing 62 is rigid and durable. As a still further alternative, the optical components 50-56 may be affixed directly to each other. As an additional further alternative, all of the optical components may be housed within chassis 64, while optional graphical user interface 60 and additional processors may be contained in a separate housing separate from chassis 64.

The fixed spatial relationship of the optical components 50-56 within a single housing 62 provides several advantages. First, none of the optical components 50-56 are individually exposed to the outside environment, thereby lessening the risk that an optical component may be jarred or disturbed during testing, which would disrupt the optical interconnections therebetween and place the testing results in doubt.

Secondly, each of the optical components 50-56 has a input/output (I/O) control connection that electrically couples each optical component 50-56 to the control unit 58. These I/O control connections permit the control unit 58 to control all of the optical components 50-56 from a common point. Also, the output from each of the optical components 50-56 can be monitored by the control unit 58. The use of common control unit 58 providing selective control of each optical component 50-56 greatly simplifies any testing procedures that are implemented. Also the use of common control unit 58 enables calibration of all of the optical components 50-56 from a single common control point.

The control unit 58 is programmable to perform an internal calibration of optical input and output power of the optical components 50-56 for example, and also to perform a calibration of the internal bit error rate of the entire testing apparatus for example. Control unit 58 stores these values of input and output power and internal bit error rate, and develops a control chart indicative of stability of these parameters with respect to time.

The internal calibration may be performed using either an external feedback loop, such as a jumper between an optical output port 80 and an optical input port 82, or using a built-in internal feedback loop that is selectively switched in and out as desired to provide a feedback path between the output and input ports 80 and 82. The built-in internal feedback loop may include optical switches 130 and 131 respectively inserted at fiber optic cables 98 and 102, and bypass jumper fiber optic cable 132 coupled between optical switches 130 and 131. Optical switches 130 and 131 are configurable to be in a pass-through mode so that the original circuit is realized and internal calibration via bypass jumper fiber optic cable 132 is not carried out. Optical switches 130 and 131 are also configurable to be in an internal calibration mode, providing an internal feedback loop from optical splitter 92 to optical receiver 56 via optical cable 98, optical switch 130, bypass jumper fiber optic cable 132, optical switch 131 and optical fiber 102. Optical switches 130 and 131, and fiber optic cable 132 constitute an optional embodiment, and are thus shown as dotted lines. Also, it should be understood that optical switches 130 and 131 may be selectively controlled by control unit 58 to be configured in the pass-through and internal calibration modes.

Each of the optical components 50-56 also includes one or more optical interconnections. For example, the optical transmitter 50 includes an optical output 70. The optical attenuator 52 includes an optical input 72 and also an optical output 74. The optical power monitor 54 includes an optical input 76, and the optical receiver 56 includes an optical input 78. The optical splitter 92 includes an optical input 93 and two optical outputs 95 and 97. The housing 62 includes the optical output port 80 and the optical input port 82. The DUT is removably coupled at an RX input to optical output port 80 of the testing apparatus and is removably coupled at a TX output to the optical input port 82 of the testing apparatus. Incidentally, it should be understood that the DUT is not limited as being a single component, but may be a subsystem or a system to be tested.

A fiber optic cable 90 is coupled between the optical transmitter 50 and the optical attenuator 52. An optical splitter 92 is coupled to split the signal from the optical attenuator 52 into two possibly unequal outputs: a first optical output 95 to the optical output port 80, and a second optical output 97 to the optical power monitor 54. The optical splitter 92 is coupled to the optical attenuator 52, the optical output port 80 and the optical power monitor 54 via three fiber optic cables 96, 98 and 100 respectively. Finally, a fiber optic cable 102 couples the optical input port 82 with the optical receiver 56. All of the optical cables 90, 96, 98, 100 and 102 (and also optional bypass jumper fiber optic cable 132) may be rigidly attached to the chassis 64 or otherwise secured to prevent the fiber optic cables from mechanical disruption, such as jarring, whipping or breaking. Mechanical disruption may ultimately degrade the optical interconnections between the optical components 50-56 and lead to unreliable testing results.

Also, it should be understood that optical functions may be combined and the corresponding optical connections eliminated. For example, optical splitter 92 and optical power monitor 54 may be combined as a monitoring tap. Also, optical output and/or input ports 80 and 82 may be combined respectively with optical splitter 92 and optical receiver 56, to eliminate cabling.

Although all of the optical cables 90, 96, 98, 100 and 102 may be coupled to the optical components 50-56 via mechanical connectors, in an illustrative embodiment of the present invention, the optical cables 90, 96, 98, 100 and 102 are fused directly to the optical components 50-56. As should be realized, optical components are typically constructed with a fiber optic lead as an optical input or output. This permits a mechanical connector to be spliced onto the fiber optic lead for subsequent coupling with other mechanical connectors. Mechanical connectors are typically utilized in testing arrangements since they provide an efficient method for temporarily and repeatedly coupling and decoupling different optical components to provide a desired testing arrangement. However, since the present invention provides the optical components 50-56 in a permanent, fixed relationship within a single housing 62, there is no need for repeated coupling and decoupling. In accordance with the present invention, these fiber optic leads are permanently coupled directly to the fiber optical cables 90, 96, 98, 100 and 102, thereby obviating the need for any temporary mechanical connectors and all of the disadvantages associated therewith. It should be understood that the scope of the invention includes any method of permanently coupling the fiber optic cables 90, 96, 98, 100 and 102 with the optical components 50-56 including splicing, fusing, gluing or any other manner of permanently connecting the fiber optic cables 90, 96, 98, 100 and 102 with the optical components 50-56.

The control unit 58 also includes an I/O control interconnection 108 with the graphical user interface 60, to permit the control unit 58 to control the graphical user interface 60 and also to accept user input via the graphical user interface 60. It should be understood that user interface 60 should not be limited as a graphical interface, but may be any type of user interface such as a keyboard or a mouse, for example.

It should be noted that although all of the optical components 50-56 have been herein described as discrete components, the components should not necessarily be limited merely as discrete. For example, the optical power monitor 54 may be a combination of an optical splitter, an optical detector and a power meter. Particularly, the function performed by the optical components 50-56 should be of interest, not merely such arbitrary delineations which are illustrated in FIG. 2 by way of example only.

Although not shown in FIG. 2, the present invention may also include an input optical attenuator located between the optical input port 82 and the optical receiver 56. The optical attenuator may also be part of the optical receiver 56. The optical attenuator may generally function as an automatic gain control to prevent damage to the optical receiver 56 in the event that the DUT has higher optical output power than expected.

Figure 3:
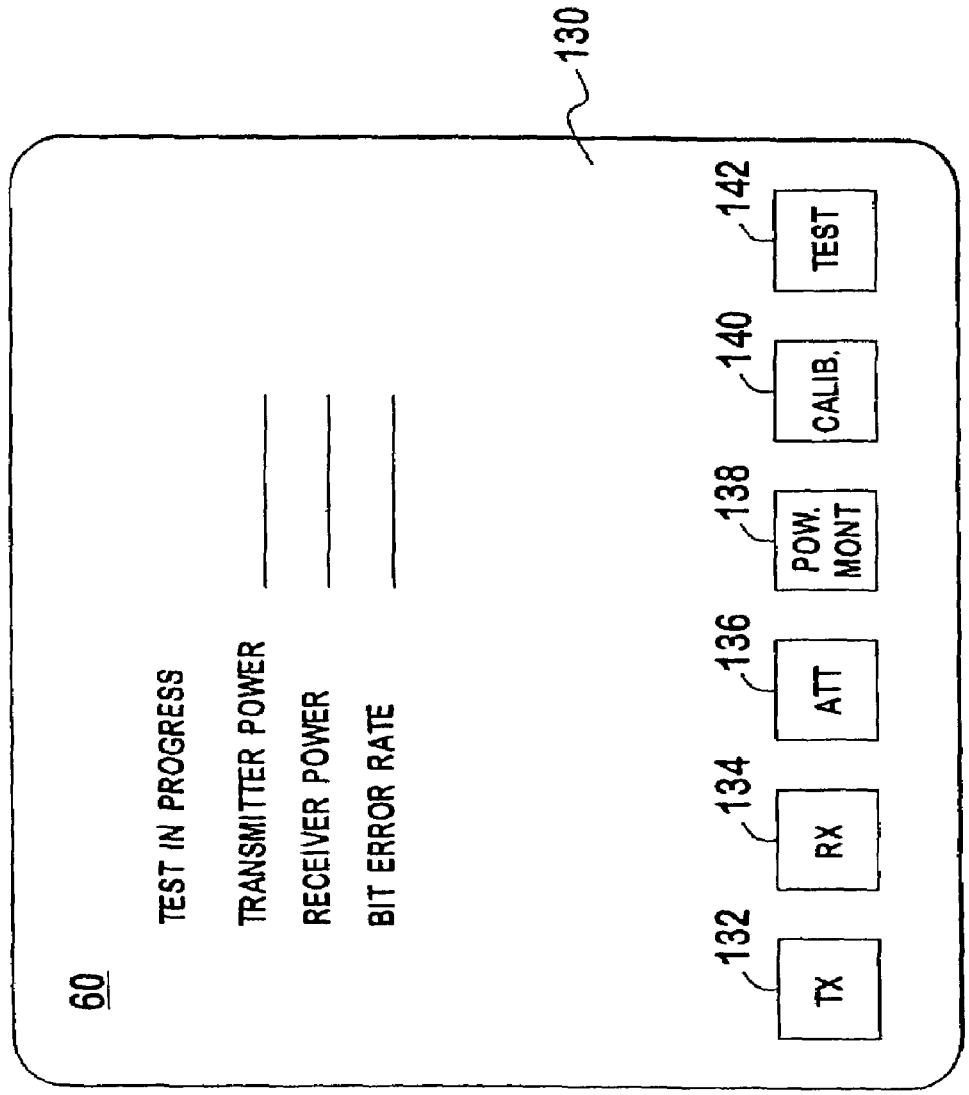
FIG. 3 is the graphical user interface usable in the testing apparatus of FIG. 2.

Referring to FIG. 3, an exemplary graphical user interface 60 is shown in greater detail. The graphical user interface 60 may include a touch-sensitive screen 130 for example, which may be changeable depending upon the graphical buttons 132-140 which are selected. Alternatively, and as previously described, the user interface 60 may be a CRT screen and may include an associated mouse and/or keyboard (not shown) for selecting the different options on the screen 130.

In order to make the testing apparatus as user friendly as possible, the bottom portion, or any other localized portion of the screen 130, may provide discrete selection options by way of transmitter button 132, receiver button 134, attenuator button 136, power monitor button 138, and separate calibration routine and test routine buttons 140 and 142. It should be understood that different types and numbers of buttons 132-142 may be provided on the screen 130 or programmed as desired by the user, to implement or control various functions or testing routines that are commonly implemented by the user, and that the set up of screen 130 as illustrated in FIG. 3 thus should not be construed as limiting.

In operation, one of buttons 132-142 in FIG. 3 is selected to initiate a desired function, such as test button 142 for example. This will permit the test to begin. The technician will then select the desired transmitter power and receiver power, and begin observing the bit error rate at a plurality of power levels which are preselected or automatically selected by the test routine 142 to converge to the sensitivity of the DUT.

Figure 4:
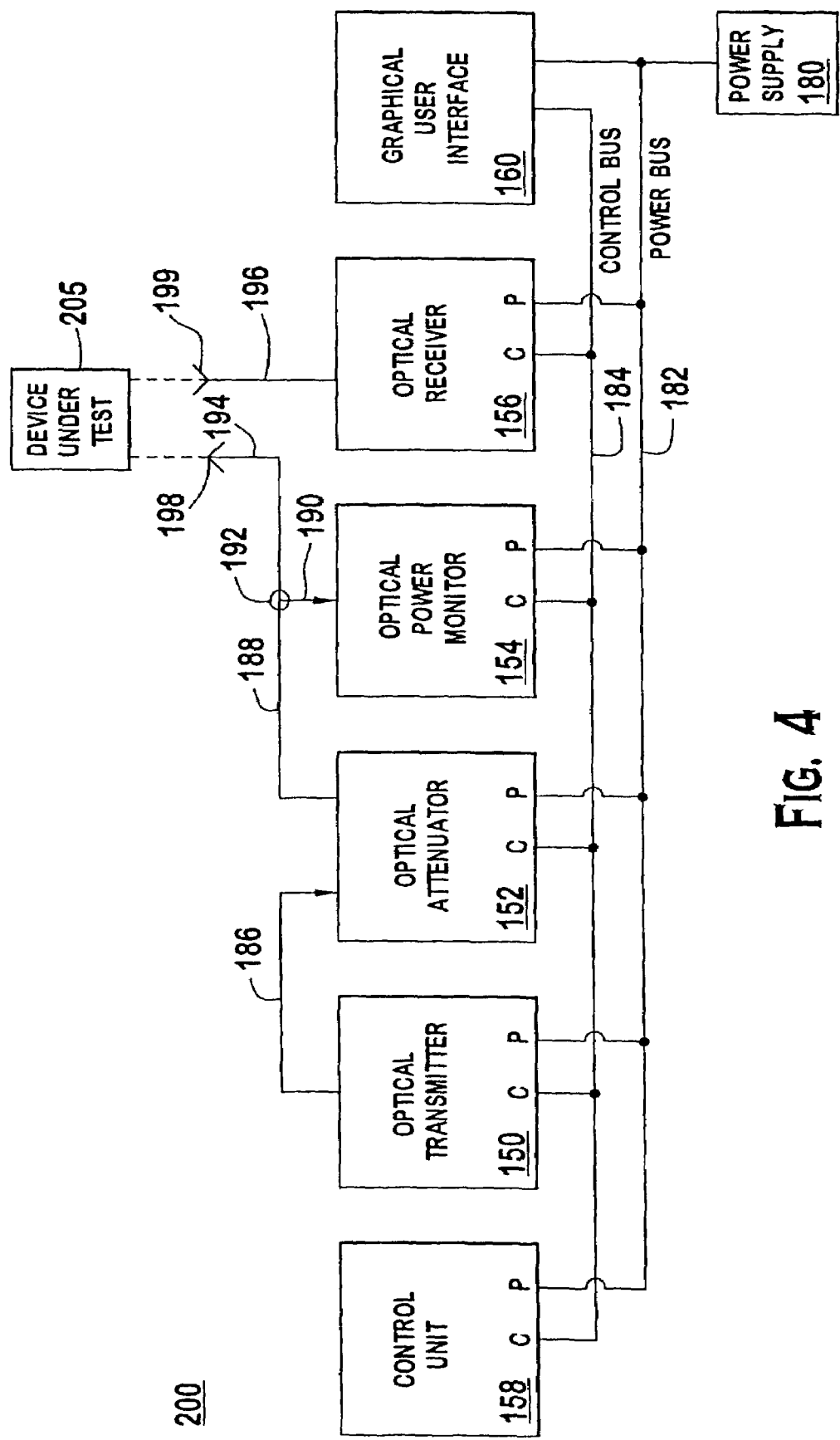
FIG. 4 is a schematic of an alternative testing apparatus of the present invention.

Referring to FIG. 4, another exemplary embodiment of the present invention is schematically illustrated. This embodiment includes the same basic components as shown in FIG. 2. Accordingly, the system 200 of this embodiment includes a control unit 158, an optical transmitter 150, an optical attenuator 152, an optical power monitor 154, an optical receiver 156 and a graphical user interface 160. The system 200 also includes the fiber optic cables 186, 188, 190, 194 and 196, and optical splitter 192, optical output 198 to DUT 205 and optical input 199 provided from DUT 205. However, this embodiment is optimized for the single unitary structure of the present invention by including a common control bus 184, and by including a common power bus 182 that is coupled to a power supply 180. Each active component 150-160 of the system is coupled to both the control bus 184 and the power bus 182. This permits the elimination of redundant power supplies and power feeds to each separate component, permits a single control bus to control all of the components 150-160, and eliminates all redundant user interfaces with each optical component. In this embodiment, all of the optical components 150-156 are fixed in a rigid spatial relationship. Also, the optical cables 186, 188, 190, 194 and 196 are rigidly attached to the chassis (not shown in FIG. 4) to prevent inadvertent degradation or complete separation of an interconnection between optical components, and are mechanically coupled directly to the leads of the optical components 150-160.

The invention having been described in detail, it will be readily apparent to one having ordinary skill in the art that the invention may be varied in a variety of ways. Such variations are not to be regarded as a departure from the scope of the invention. All such modifications as would be obvious to one of ordinary skill in the art, having had the benefit of the present disclosure, are intended to be included within the scope of the appended claims and the legal equivalents thereof.

What is claimed is:

1. An optical testing apparatus for measuring sensitivity of an optical component, the optical component having an input port and an output port, the optical testing apparatus comprising:
    an optical signal generator for generating an optical signal at a selectable power level;
    a first port for providing the optical signal as an output of the optical testing apparatus for coupling to the input port of the optical component;
    a second port for coupling the optical testing apparatus to the output port of the optical component; and
    an optical receiver for receiving the optical signal from the optical component via the second port and for analyzing the received optical signal for errors;
    wherein the optical signal generator and the optical receiver are secured on a platform, substantially rigidly fixed in relation to each other, and
    wherein the optical signal generator comprises an optical transmitter and an optical attenuator rigidly fixed in relation to each other.

2. The optical testing apparatus of claim 1, further comprising a controller that controls said optical signal generator and said optical receiver.

3. The optical testing apparatus of claim 2, further comprising a user interface, coupled to said controller, that receives an input from a user and that provides an output to the user.

4. The optical testing apparatus of claim 3, wherein the user interface is a graphical user interface.

5. The optical testing apparatus of claim 1, further comprising:
    a first fiber optic cable that couples said optical signal generator to said first port; and
    a second fiber optic cable that couples said optical receiver to said second port,
    said first fiber optic cable being rigidly fixed in relation to said optical signal generator and said first port, and said second fiber optic cable being rigidly fixed in relation to said second port and said optical receiver.

6. The optical testing apparatus of claim 5, whereby said first fiber optic cable is permanently coupled to said optical signal generator and said first port, and said second fiber optic cable is permanently coupled to said second port, and said optical receiver.

7. A testing apparatus for measuring sensitivity of an optical component, the testing apparatus comprising:
    an optical signal generator that generates and outputs an optical signal at a selectable power level as an output of the testing apparatus to the optical component;
    an optical receiver that receives the optical signal from the optical component as an input of the testing apparatus and analyzes the received optical signal for errors;
    a controller that controls the optical signal generator and the optical receiver; and
    a housing that encloses the optical signal generator, the optical receiver and the controller, the optical signal generator and the optical receiver being mounted in a substantially fixed relationship to each other within the housing,
    wherein the optical signal generator comprises an optical transmitter and an optical attenuator which are mounted in a fixed relationship to each other.

8. The testing apparatus of claim 7, further comprising:
    a first fiber optic cable that couples said optical signal generator with an output port of the testing apparatus; and
    a second fiber optic cable that couples said optical receiver with an input port of the testing apparatus,
    said first fiber optic cable being mounted in a fixed relationship to said optical signal generator and said output port, and said second fiber optic cable being mounted in a fixed relationship to said input port and said optical receiver.

9. The testing apparatus of claim 8, whereby said first fiber optic cable is permanently coupled to said optical signal generator and said output port, and said second fiber optic cable is permanently coupled to said input port and said optical receiver.

10. The testing apparatus of claim 7, further comprising a user interface, coupled to said controller, that provides input/output of the testing apparatus.

11. The testing apparatus of claim 10, wherein the user interface is a graphical user interface.

12. A testing apparatus for measuring sensitivity of an optical component, the optical component having an input Dort and an output port, the testing apparatus comprising;
    an optical signal generator for generating an optical signal at a selectable power level for application to the input port of the optical component;
    an optical receiver for receiving the optical signal from the output port of the optical component and analyzes the received optical signal for errors; and
    a generally rigid platform for retaining the optical signal generator and the optical receiver in a fixed relationship to each other,
    wherein the optical signal generator comprises an optical transmitter and an optical attenuator which are in a fixed relationship to each other.

13. The testing apparatus of claim 12, further comprising a controller that controls said optical signal generator and said optical receiver.

14. The testing apparatus of claim 13, further comprising a graphical user interface, coupled to said controller, that provides a graphic output of the testing apparatus.

15. The testing apparatus of claim 12, whereby the optical signal generator and the optical receiver are coupled directly together to maintain the fixed relationship to each other.

16. The optical testing apparatus of claim 12, further comprising a controller for controlling the optical signal generator and the optical receiver.

17. The testing apparatus of claim 16, further comprising a graphical user interface, coupled to the controller, for providing a graphical input/output of the testing apparatus.

18. The optical testing apparatus of claim 12, further comprising:
- a first fiber optic cable coupling the optical signal generator with an output port of the testing apparatus; and
- a second fiber optic cable coupling the optical receiver with an input port of the testing apparatus.

19. An optical testing apparatus for measuring sensitivity of an optical component, the optical component having an input port and an output port, the optical testing apparatus comprising:
- an optical signal generator for generating an optical signal at a selectable power level;
- a first port for providing the optical signal as an output of the optical testing apparatus for coupling to the input port of the optical component;
- a second port for coupling the optical testing apparatus to the output port of the optical component;
- an optical receiver for receiving the optical signal from the optical component via said second port and for analyzing the received optical signal for errors;
- a first fiber optic cable for permanently coupling the optical signal generator to the first port; and
- a second fiber optic cable for permanently coupling the optical receiver to the second port,
- wherein the optical signal generator and the optical receiver are substantially rigidly fixed in relation to each other on a platform; and
- wherein the first fiber optic cable is rigidly fixed in relation to the optical signal generator and the first port, and the second fiber optic cable is rigidly fixed in relation to the second port and the optical receiver.

20. A testing apparatus for measuring sensitivity of an optical component, the testing apparatus comprising:
- an optical signal generator configured to generate and output an optical signal at a selectable power level as an output of the testing apparatus to the optical component;
- an optical receiver configured to receive the optical signal from the optical component as an input of the testing apparatus and to analyze the received optical signal for errors;
- a first fiber optic cable configured to couple the optical signal generator with an output port of the testing apparatus, the first fiber optic cable being permanently coupled to the optical signal generator and the output port;
- a second fiber optic cable configured to couple the optical receiver with an input port of the testing apparatus, the second fiber optic cable being permanently coupled to the input port and the optical receiver;
- a controller configured to control the optical signal generator and the optical receiver; and
- a housing that encloses the optical signal generator, the optical receiver and the controller, the optical signal generator and the optical receiver being mounted in a substantially fixed relationship to each other within the housing,
- wherein the first fiber optic cable is mounted in a fixed relationship to the optical signal generator and the output port, and the second fiber optic cable is mounted in a fixed relationship to the input port and the optical receiver.

* * * * *